(12) United States Patent
Graepel et al.

(10) Patent No.: US 7,167,849 B2
(45) Date of Patent: Jan. 23, 2007

(54) INVARIANT PATTERN RECOGNITION

(75) Inventors: Thore Graepel, Cambridge (GB); Ralf Herbrich, Cambridge (GB)

(73) Assignee: Microsoft Corporation, Redmond, WA (US)

(*) Notice: Subject to any disclaimer, the term of this patent is extended or adjusted under 35 U.S.C. 154(b) by 569 days.

(21) Appl. No.: 10/697,727

(22) Filed: Oct. 29, 2003

(65) Prior Publication Data

US 2005/0097068 A1    May 5, 2005

(51) Int. Cl.
- *G06E 1/00* (2006.01)
- *G06E 3/00* (2006.01)
- *G06F 15/18* (2006.01)
- *G06F 7/00* (2006.01)

(52) U.S. Cl. ................................................. 706/20
(58) Field of Classification Search .................. 706/12, 706/20
See application file for complete search history.

(56) References Cited

U.S. PATENT DOCUMENTS

| | | | | |
|---|---|---|---|---|
| 5,422,961 | A * | 6/1995 | Simard | 382/224 |
| 5,572,628 | A * | 11/1996 | Denker et al. | 706/25 |
| 5,768,420 | A * | 6/1998 | Brown et al. | 382/203 |
| 6,178,261 | B1 * | 1/2001 | Williams et al. | 382/190 |
| 6,996,549 | B2 * | 2/2006 | Zhang et al. | 706/16 |
| 2005/0071300 | A1 * | 3/2005 | Bartlett et al. | 706/12 |

OTHER PUBLICATIONS

P. Simard, Y. LeCun, J. S. Denker, B. Victorri, "Transformation Invariance in Pattern Recognition-Tangent Distance and Tangent Propagation", Lecture Notes In Computer Science; vol. 1524, 1998□□.*

Haasdonk, B.; Keysers, D., "Tangent distance kernels for support vector machines", Pattern Recognition, 2002. Proceedings. 16th International Conference on, vol. 2, Aug. 11-15, 2002 pp. 864-868 vol. 2.*

B Schölkopf, C Burges, V Vapnik, "Incorporating Invariances in Support Vector Learning Machines", Proceedings of the 1996 International Conference on Artificial Neural Networks, pp. 47-52, 1996.*

O Chapelle, B Scholkopf, "Incorporating invariances in nonlinear support vector machines", published at http://www.kyb.tuebingen.mpg.de/publications/pss/ps2166.ps, Jun. 20, 2001.*

* cited by examiner

*Primary Examiner*—Anthony Knight
*Assistant Examiner*—Michael B. Holmes
(74) *Attorney, Agent, or Firm*—Microsoft Corporation

(57) ABSTRACT

An adaptive pattern classifier makes use of training patterns and a known non-linear invariance transformation to generate a classifier representation based on an infinite set of virtual training samples on a training trajectory. Given the non-linear invariance transformation, optimization can be formulated as a semidefinite program (SDP), which is given by a linear objective function that is minimized subject to a linear matrix inequality (LMI). In this manner, a small training set may be virtually supplemented using the non-linear invariance transformation to learn an effective classifier that satisfactorily recognizes patterns, even in the presence of known transformations that do not change the class of the pattern.

77 Claims, 7 Drawing Sheets

INVARIANT PATTERN RECOGNITION

TECHNICAL FIELD

The invention relates generally to learning algorithms, and more particularly to invariant pattern recognition using semidefinite programming techniques.

BACKGROUND

Pattern recognition has been applied to a variety of problems, including handwriting recognition, speech recognition, image understanding, etc. A central problem of pattern recognition is the exploitation of known invariants in a pattern domain. Invariance represents a difference in individual target patterns (e.g., images) of a given classification that does not alter their recognized classification. For example, given two different instances of a handwritten numeral '9' (see patterns 100 and 102 in FIG. 1), both instances are still recognized (or classified) as a numeral '9'. One approach to handling invariants is to introduce invariant information into the pattern classifier's training set, which is used to generate the classifier.

In images, known invariants may include rotation, translation, sheer, scaling, brightness and lighting direction. In addition, in handwriting recognition, invariants may include line thinning/thickening and other non-uniform character differences. Also, in speech recognition (e.g., phoneme classification), invariants may include differences in base frequency or duration. A wide variety of other invariants, singly or in combination, are also possible in a wide assortment of applications. When using machine learning approaches in these applications, it is a challenge to combine a training set with knowledge of invariants in order to obtain a satisfactory pattern classifier, particularly when the training set is small.

One existing method of incorporating invariants is to include discrete invariant samples in the training set. For example, one approach takes multiple samples of a handwritten numeral '9' in the presence of invariants and adding them to the training set. Another approach generates discrete "virtual" invariant samples by the application of an invariance transformation and adds these virtual samples to the training set. However, these approaches can result in inconvenient or unwieldy training sets and, nevertheless, can result in incorrect classification caused by gaps between the discrete training samples.

Another method involves modeling invariants using a linear approximation. However, linear approximations of invariants are substantially inaccurate in most circumstances. Nevertheless, while non-linear approximations may provide greater accuracy, existing approaches have been unable to solve for non-linear approximations within given constraints.

SUMMARY

Implementations described and claimed herein address the foregoing problems using a non-linear invariant transformation to generate an infinite set of virtual training samples on a training trajectory. Given the non-linear invariant transformation, optimization can be formulated as a semidefinite program (SDP), which is given by a linear objective function that is minimized subject to a linear matrix inequality (LMI). In this manner, a small training set may be virtually supplemented using the non-linear invariant transformation to learn an effective linear classifier that satisfactorily recognizes patterns, even in the presence of invariant differences in the patterns.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The computer program product encodes a computer program for executing on a computer system a computer process. Derivatives of a nonlinear invariance transformation at a training data point are generated with respect to a transformation parameter. The training data point represents one of a plurality of training patterns. A classifier representation is generated for classifying a test pattern in the presence of the nonlinear invariance transformation.

In another implementation, a method is provided. Derivatives of a nonlinear invariance transformation at a training data point are generated with respect to a transformation parameter. The training data point represents one of a plurality of training patterns. A classifier representation is generated for classifying a test pattern in the presence of the nonlinear invariance transformation.

In another implementation, a system includes a derivative generator that generates derivatives of a nonlinear invariance transformation at a training data point with respect to a transformation parameter. The training data point represents one of a plurality of training patterns. A classifier representation generator generates a classifier representation for classifying a test pattern in the presence of the nonlinear invariance transformation.

Other implementations are also described and recited herein.

DETAILED DESCRIPTION

Figure 1:
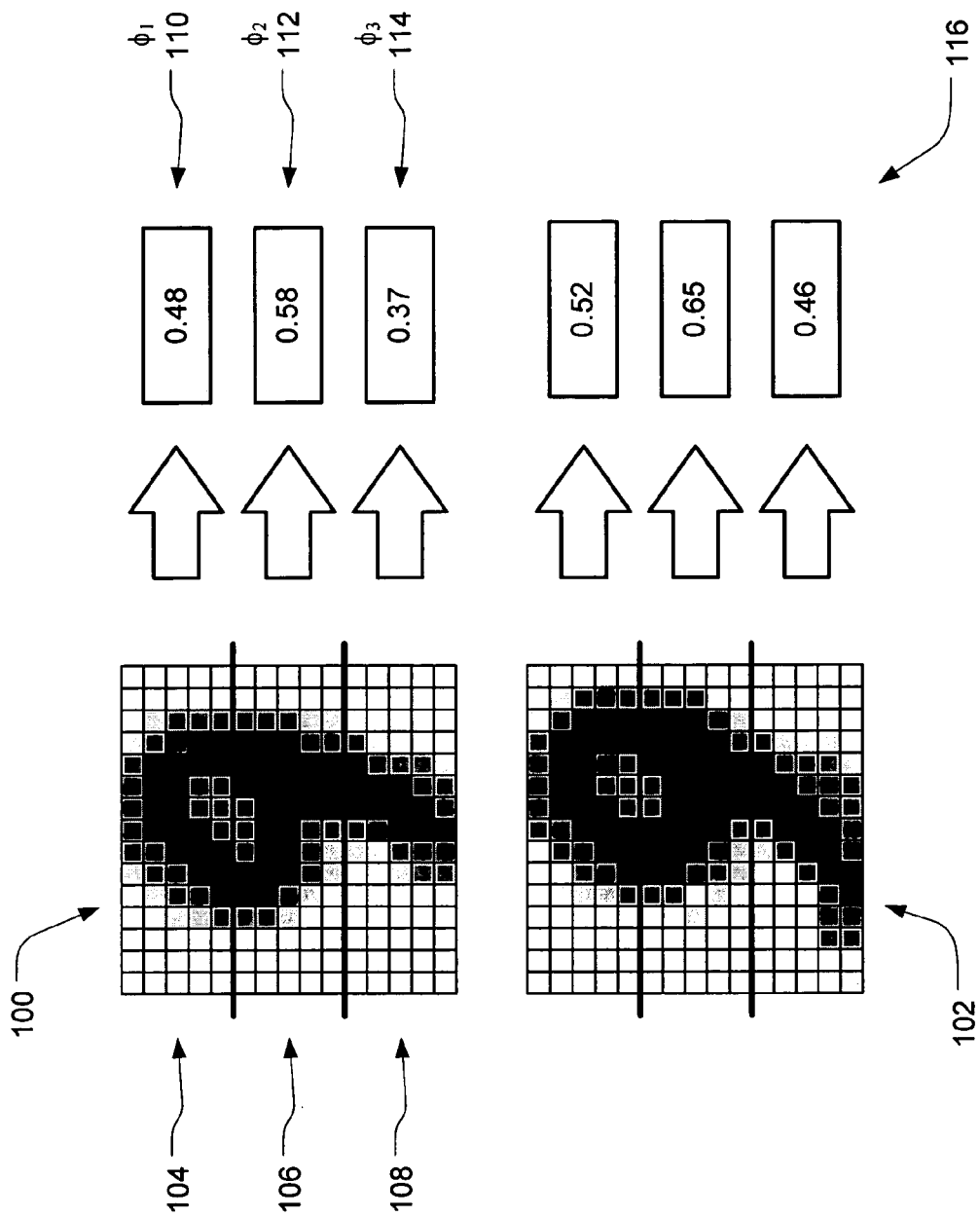
FIG. 1 illustrates a numeral pattern and an exemplary invariant pattern.

FIG. 1 illustrates a numeral pattern and an exemplary invariant pattern. Numeral pattern 100 represents a training pattern input as a member of an initial training set. The numeral pattern 100 is classified as a '9'. The exemplary invariant pattern 102, while differing from numeral pattern 100 by virtue of at least a slight rotation, is also classified as a '9'. Therefore, despite the differences between the patterns 100 and 102, the classifications are the same (i.e., invariant). In the illustrated implementation, the patterns 100 and 102 are shown as a set of pixels, where each pixel is described by an intensity value (e.g., selected 255 possible gray values). Given such intensity values, the numeral pattern 100 is characterized for inclusion in the training set.

Various methods of characterizing the patterns may be employed. In one implementation, the mean pixel intensity of all pixels within each of the three regions (104, 106, and 108) is computed, as shown by feature values $\phi_1$, $\phi_2$, and $\phi_3$ (i.e., values 110, 112, and 114, respectively). It should be understood that alternative methods of characterizing a pattern may be employed, including without limitation those that incorporate colors, individual pixel values, different regions, statistical analysis, etc. In addition, for non-visual patterns, characterization may depend on other parameters, such as frequency composition, amplitude, timing, or some other audio parameters for speech patterns. The invariant pattern 102 is also shown as characterized by feature values 116, demonstrating how the feature values of patterns in the same class can differ.

Figure 2:
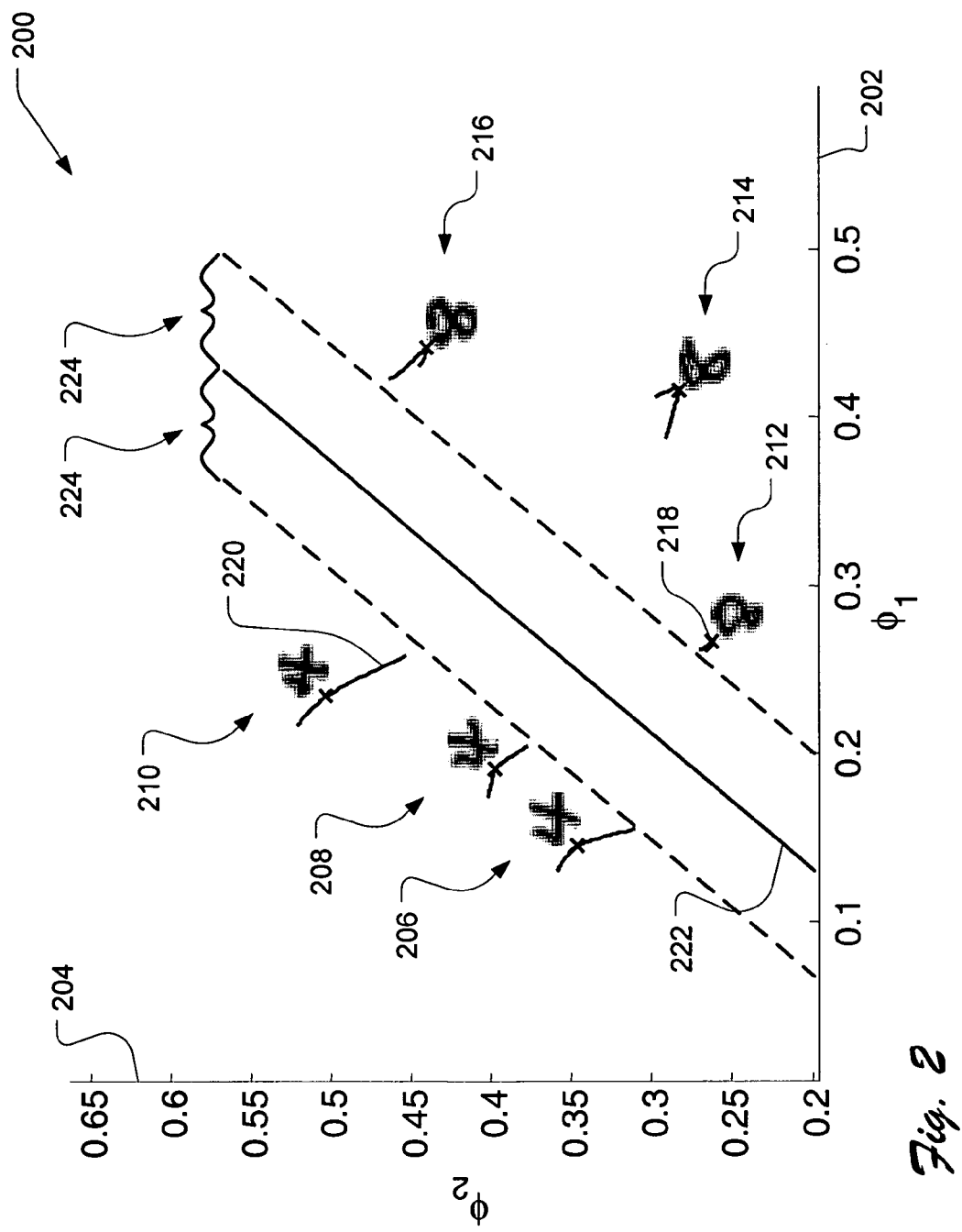
FIG. 2 illustrates a graph including exemplary six training objects and associated invariant transformation trajectories.

FIG. 2 illustrates a graph 200 including six exemplary training objects, wherein each training object is characterized by two feature values. For example, the training object may be a graphical training pattern. The x-axis 202 of the graph 200 represents possible values of the first feature value $\phi_1$ of each training object, and the y-axis 204 represents possible values of the second feature value $\phi_2$ of each training object. A two-dimensional graph 200 is used herein only in order to facilitate description. It should be understood, however, that objects may be characterized by any number of feature values.

Each illustrated training object 206, 208, and 210 (representing '4') and 212, 214, and 216 (representing '8') is represented by a vector $x_i$, where each vector component represents a feature value $\phi_j$, j represents the index of the feature value, and i represents the index distinguishing each training object (e.g., $x_i=(\phi_1\ \phi_2)$). For example, the training object 206 may be represented by $x_1=(0.144\ 0.349)$, and the training object 208 may be represented by $x_2=(0.188\ 0.399)$.

In the proximity of each object data point (e.g., data point 218 associated with object 212), data points of possible invariant patterns (e.g., invariant data points 220) associated with the corresponding object are shown. In the illustration, the invariants are the result of rotation within a predefined degree range (e.g., $\pm 12°$), although other invariants may also be present. It should be noted that the curves corresponding to transformed data points associated with several of the training objects are substantially non-linear. As such, modeling the invariant transforms of each object using a polynomial of degree $r \geq 2$ can improve classification accuracy over linear approaches. An invariant transformation can model a variety of invariants, including pattern rotations, translations, sheering, scaling, brightness, lighting direction, line thinning/thickening, frequency differences, timing differences, etc.

A conceptual objective of a linear classifier is to determine a hyper-plane (e.g., a line 222 in two dimensions) that distinctly separates objects of different classes and maximizes equal margins (e.g., margins 224) on either side of the line. Objects on one side of the line are in one class; objects on the other side of the line are in another class. The margin is maximized to provide the greatest probability of correctly classifying invariant test objects that may be input to the classifier. Since the features $\phi_j$ used can be arbitrary functions of the original input representation of the training objects including polynomials and radial basis functions the linear classifier above can implement classification that is non-linear in the original input representation.

Figure 3:
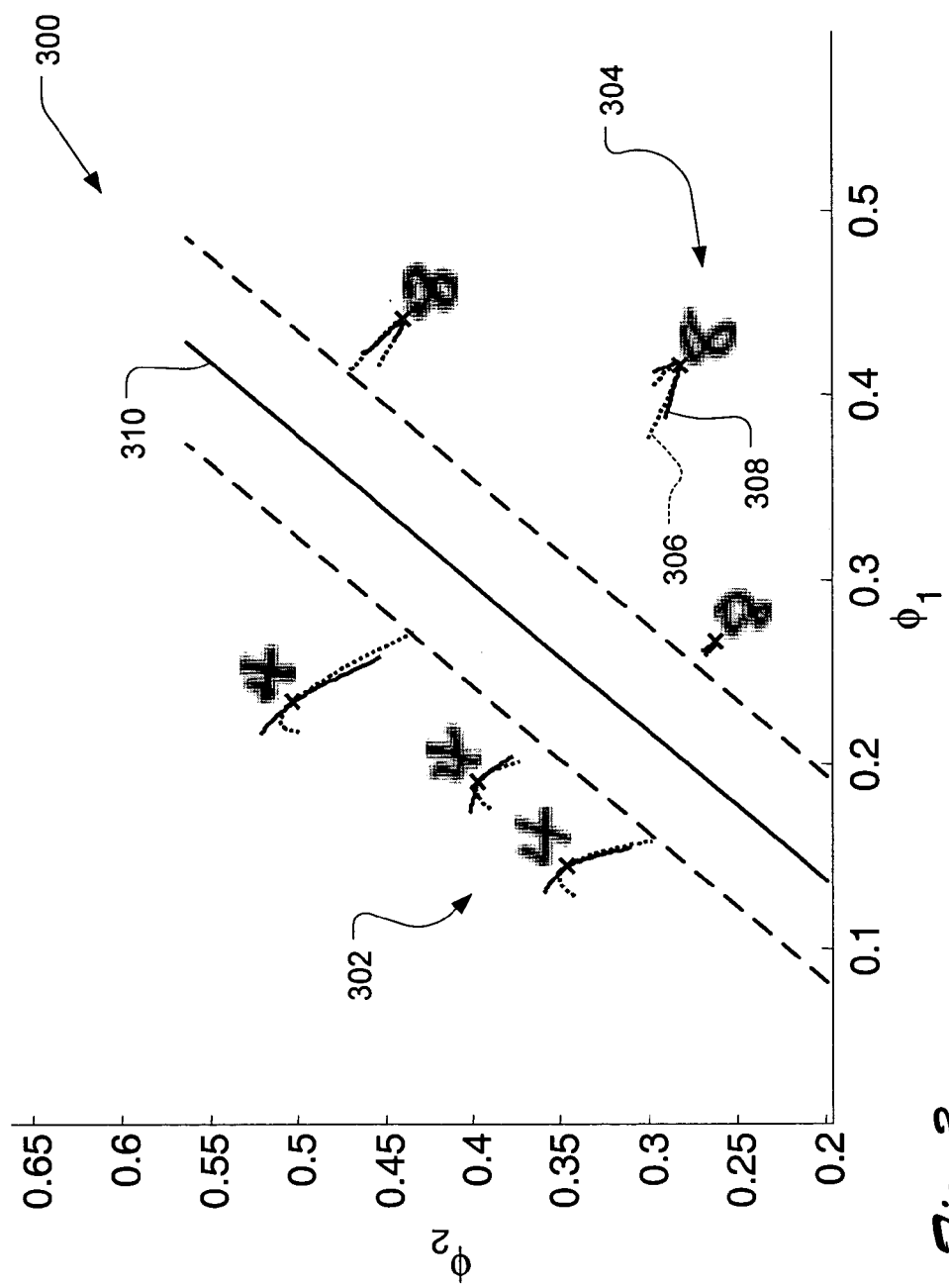
FIG. 3 illustrates a graph including six exemplary training objects and associated virtual invariant transformation trajectories.

FIG. 3 illustrates a graph 300 including six exemplary training objects and associated virtual invariant transformation trajectories. As can be seen clearly with regard to objects 302 and 304, non-linear modeling (e.g., shown as dotted line 306 for object 304) more closely approximates the actual invariant transformations of each object (e.g., shown as solid line 308 for object 304) than linear modeling.

Figure 4:
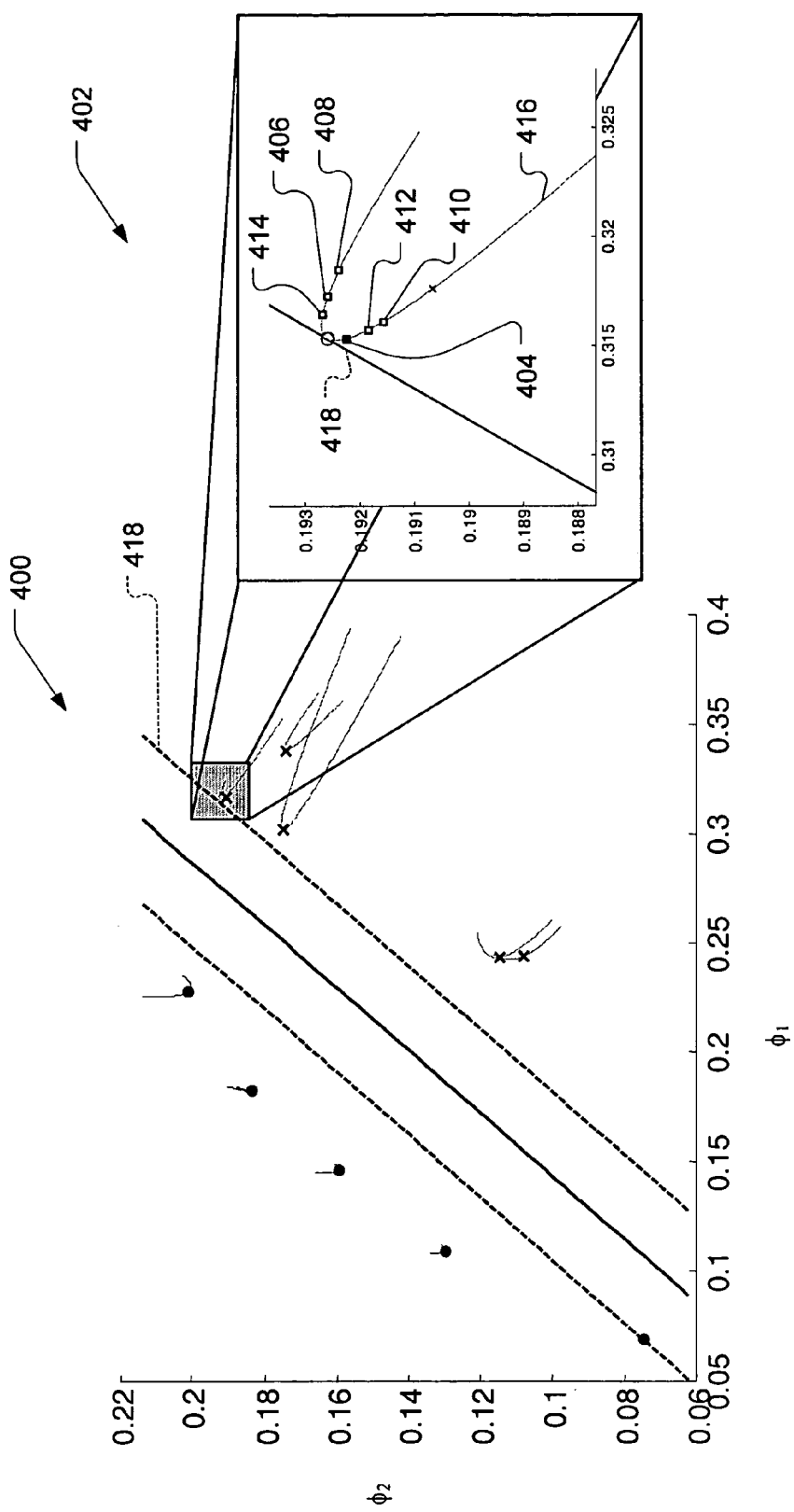
FIG. 4 shows a graph of data points and virtual invariant transforms for exemplary objects.

FIG. 4 shows a graph 400 of data points and virtual invariant transforms for exemplary training objects. A magnified portion of the graph 400 is shown in graph 402. A training object data point 404 is associated with discrete virtual invariant data points 406, 408, 410, 412, and 414 which may be generated based on a polynomial transformation. It can be seen, however, that the original training object data point 404 and the discrete virtual data points 406, 408, 410, 412, and 414 may be insufficient to provide an optimal solution if the region on the invariant transformation trajectory 416 between data points 404 and 414 falls into the margin region, resulting in possible misclassifications. As such, considering the invariant transformation trajectory 416 itself and aligning the margin 418 tangent to the trajectory 416, as described herein, provides a more accurate linear classifier.

As previously described, a training object set $((x_1, y_i), \ldots, (x_m, y_m)) \in (\mathbb{R}^n \times \{-1, +1\})^m$ may be obtained from training pattern input data, where $x_i$ represents a vector characterizing a given training pattern and $y_i$ represents a binary classification for the given training pattern (e.g., as representing either a '4' or an '8' in FIG. 3). For example, in FIG. 3, three patterns of handwritten '4's and three patterns or handwritten '8's are received as training data input and, based on the training object's location relative to the line 310 each training object is classified as either a four or an eight.

The classification of test patterns x by $y(x)=\text{sign}(w^T x)$ is based on a weight vector $w \in \mathbb{R}^n$. Assuming linear separability of the training patterns, the principle of empirical risk minimization recommends finding a weight vector w such that, for all $i \in \{1, \ldots, m\}$, $y_i w^T x_i \geq 0$. As such, the problem constitutes a linear feasibility problem.

However, in order to correctly classify patterns under the known invariance transformation $T(\theta, \bullet)$, the approach described above is generalized into the following feasibility problem:

$$\text{find } w \in \mathbb{R}^n \text{ such that } \forall i \in \{1, \ldots, m\}: \forall \theta \in \mathbb{R}: y_i w^T x_i(\theta) \geq 0 \quad (1)$$

That is, the weight vector would correctly classify every transformed test pattern $x_i(\theta) := T(\theta, x_i)$ for every value of the transformation parameter $\theta$.

The invariance transformation T can be approximated by a transformation polynomial in $\theta$, such as a Taylor expansion of the form:

$$\hat{T}(\theta, x_i) \approx T(0, x_i) + \sum_{j=1}^{r} \theta^j \cdot \left( \frac{1}{j!} \frac{d^j T(\theta, x_i)}{d\theta^j} \bigg|_{\theta=0} \right) \quad (2)$$

$$= T(0, x_i) + \sum_{j=1}^{r} \theta^j \cdot (X_i)_{j,\cdot}$$

However, other forms of transformation polynomial may be employed.

Given this approximation, the feasibility problem may be simplified by considering only the transformations on the trajectory $$\{\tilde{T}(\theta,x):\theta\in\mathbb{R}\}\subset\mathbb{R}^n \quad (3)$$

of polynomial form (i.e., $\tilde{x}_i(\theta):=\tilde{T}(\theta,x_i)=X_i^T\theta$), each polynomial example $\tilde{x}_i(\theta)$ being represented by a polynomial and its derivatives in the r+1 row vectors of $X_i\in\mathbb{R}^{(r+1)\times n}$, with $\theta:=(1,\theta,\ldots,\theta^r)^T$. The columns j of $X_i$ represent the coefficients of the polynomial and its derivatives (e.g., x',x"). For example where r=2:

$$X_i = \begin{pmatrix} x \\ x' \\ x'' \end{pmatrix} \quad (4)$$

The feasibility problem defined by Equation (1) thus simplifies to:

find $w\in\mathbb{R}^n$ such that $\forall i\in\{1,\ldots,m\}:\forall\theta\in\mathbb{R}:y_i\cdot w^T X_i^T\theta\geq 0$ (5)

which represents finding a weight vector w such that the polynomials $p_i(\theta)=y_i w^T X_i^T\theta$ are non-negative everywhere (i.e., $p_i\in\mathcal{P}_r^+$).

Given the problem statement defined in Equation (5), the following proposition by Nesterov supports a semidefinite programming formulation of Equation (5), whenever r=2l:

Semidefinite Representation of Non-Negative Polynomials (Nesterov)

The set $\mathcal{P}_{2l}^+$ of polynomials that are non-negative everywhere on the real line is semidefinite representable in the sense that 1. for every positive semidefinite matrix $P\geq 0$, the polynomial $p(\theta)=\theta^T P\theta$ is non-negative everywhere, $p\in\mathcal{P}_{2l}^+$.
2. for every polynomial $p\in\mathcal{P}_{2l}^+$, there exists a positive semidefinite matrix $P\geq 0$ such that $p(\theta)=\theta^T P\theta$.

In other words, Nesterov proposes that the set of polynomials $\mathcal{P}_{2l}^+$ of degree 2l non-negative on the entire real line is a convex set representable by positive semidefinite (psd) constraints. Therefore, optimization over $\mathcal{P}_{2l}^+$ can be formulated as a semidefinite program (SDP), which may be given by a linear objective function that is minimized subject to a linear matrix inequality (LMI):

$$\underset{w\in\mathbb{R}^n}{\text{minimize}}\, c^T w \text{ subject to } A(w) := \sum_{k=1}^{n} w_k A_k - B \geq 0 \quad (6)$$

The LMI $A(w)\geq 0$ means that $A(w)$ is required to be positive semidefinite. That is, for all $v\in\mathbb{R}^n$, $$v^T A(w) v = \sum_{k=1}^{n} w_k (v^T A_k v) - v^T B v \geq 0 \quad (7)$$

which reveals that LMI constraints correspond to infinitely many linear constraints. This expressive power can be used to enforce constraints for training objects as given by Equation (3) (i.e., constraints can be used to hold for all values $\theta\in\mathbb{R}$). Based on the representability theorem for non-negative polynomials, a learning algorithm can be developed in the form of a Semidefinite Programming Machine (SDPM) that maximizes the margin on polynomial training objects, much like the support vector machine for ordinary single vector data.

As such, Nesterov's proposition may be applied to develop a semidefinite programming formulation for the problem of learning a maximum margin classifier given the polynomial constraints of Equation (5). In one implementation, the squared objective $\|w\|^2$ is minimized by replacing it with an auxiliary variable t, subject to a quadratic constraint $t\geq\|w\|^2$ that is written as an LMI (i.e., an optimization problem) using Schur's complement lemma:

$$\underset{(w,t)}{\text{minimize}}\, \frac{1}{2} t \text{ subject to } F(w,t) := \begin{pmatrix} I_n & w \\ w^T & t \end{pmatrix} \geq 0, \text{ and} \quad (8)$$

$$\forall i: G(w, X_i, y_i) := G_0 + \sum_{k=1}^{n} w_k G_k((X_i)_{\bullet,k}, y_i) \geq 0$$

where $(X_i)_{\bullet,k}$ denotes the $k^{th}$ column of $X_i$ and $G\geq 0$ represents a semidefinite programming constraint. Therefore, Equation (8) represents a semidefinite programming problem.

For illustration, consider the case of l=0 (the simplest non-trivial case). The constraint matrix $G(w,X_i,y_i)$ reduces to a scalar $y_i w^T x_i - 1$, which translates into the standard support vector machine constraint $y_i w^T x_i \geq 1$ linear in w.

For l=1, $G(w,X_i,y_i)\in\mathbb{R}^{2\times 2}$ and $$G(w, X_i, y_i) := \begin{pmatrix} y_i w^T (X_i)_{0,\bullet} - 1 & \frac{1}{2} y_i w^T (X_i)_{1,\bullet} \\ \frac{1}{2} y_i w^T (X_i)_{1,\bullet} & y_i w^T (X_i)_{2,\bullet} \end{pmatrix} \quad (9)$$

where $(X_i)_{0,\bullet}$ represents the original data vector, $(X_i)_{1,\bullet}$ represents the first derivative of the transformation polynomial at $\theta=0$, and $(X_i)_{2,\bullet}$ represents the second derivative of the transformation at $\theta=0$.

For the case of $l\geq 2$, the resulting problem constitutes a full semidefinite program. For illustration, consider the case l=2. Because a polynomial p of degree four is fully determined by its five coefficients $p_0,\ldots,p_4$, but the symmetric matrix $P\in\mathbb{R}^{3\times 3}$ in $p(\theta)=\theta^T P\theta$ has six degrees of freedom, one auxiliary variable $u_i$ is used per training object:

$$G(w, u_i, X_i, y_i) := \quad (10)$$

$$\begin{pmatrix} y_i w^T (X_i)_{0,\bullet} - 1 & \frac{1}{2} y_i w^T (X_i)_{1,\bullet} & \frac{y_i w^T (X_i)_{2,\bullet} - u_i}{2} \\ \frac{1}{2} y_i w^T (X_i)_{1,\bullet} & u_i & \frac{1}{2} y_i w^T (X_i)_{3,\bullet} \\ \frac{y_i w^T (X_i)_{2,\bullet} - u_i}{2} & \frac{1}{2} y_i w^T (X_i)_{3,\bullet} & \frac{1}{2} y_i w^T (X_i)_{4,\bullet} \end{pmatrix}$$

Generally, because a polynomial of degree 2l has 2l+1 coefficients and a symmetric (l+1)×(l+1) matrix has $$\frac{1}{2}((l+1) \times (l+2))$$

degrees of freedom, then $$\frac{1}{2}(l-1)l$$

auxiliary variables are used.

The dual of the general semidefinite program (shown in Equation (5)) is represented by:

$$\underset{\Lambda \in \mathbb{R}^{m \times m}}{\text{maximize}} \, tr(B\Lambda) \text{ subject to } \forall \, j \in \{1, \ldots, n\}: tr(A_j \Lambda) = c_j; \quad (11)$$

$$\Lambda \succeq 0$$

where $\Lambda$ represents a matrix of dual variables.

The complementarity conditions for the optimal solution $(w^*,t^*)$ read $A((w^*,t^*))\Lambda^*=0$. Therefore, the dual formulation of Equations (8) and (9) for l=1, combined with the F(w,t) portions of the complementarity conditions may be given by:

$$\underset{(\alpha,\beta,\gamma) \in \mathbb{R}^{3m}}{\text{maximize}} -\frac{1}{2} \sum_{j=1}^{m} \sum_{k=1}^{m} y_j y_k [\tilde{x}(\alpha_j, \beta_j, \gamma_j, X_j)]^T [\tilde{x}(\alpha_k, \beta_k, \gamma_k, X_k)] + \quad (12)$$

$$\sum_{j=1}^{m} \alpha_j$$

$$\text{subject to } \forall \, j \in \{1, \ldots, m\}: M_j := \begin{pmatrix} \alpha_j & \beta_j \\ \beta_j & \gamma_j \end{pmatrix} \succeq 0$$

with extrapolated training objects $\tilde{x}(\alpha_i,\beta_i,\gamma_i,X_i):=\alpha_i(X_i)_{0,\bullet}+\beta_i(X_i)_{1,\bullet}+\gamma_i(X_i)_{2,\bullet}$. Equation (9) has a quadratic objective and positive semidefinite constraints and can therefore be formulated as a standard semidefinite program in the form of Equation (6). In addition, the complementarity conditions reveal that the optimal weight vector $w^*$ can be expanded as:

$$w^* = \sum_{i=1}^{m} y_i \tilde{x}(\alpha_i, \beta_i, \gamma_i, X_i) \quad (13)$$

Given l=1, using Equation (6) and assuming primal and dual feasibility, $$G(w^*, X_i, y_i) \cdot M^*_i = 0 \quad (14)$$

for all $i \in \{1, \ldots, m\}$ at the solution $(w^*,t^*,M^*_i)$. The trace of Equation (14) translates into:

$$y_i w^{*T} (\alpha^*_i (X_i)_{0,\bullet} + \beta^*_i (X_i)_{1,\bullet} + \gamma^*_i (X_i)_{2,\bullet}) = \alpha^*_i \quad (15)$$

The following proposition allows characterization of the solution:

Sparse Expansion

The expansion in Equation (13) of the optimal weight vector $w^*$ in terms of training objects $X_i$ is sparse in the following sense:

Only those training objects $X_i$ ("support vectors") may have non-zero expansion coefficients $\alpha^*_i$, which lie on the margin (i.e., for which $G_i(w^*,X_i,y_i) \geq 0$ rather than $G_i(w^*,X_i,y_i) > 0$. Furthermore, in this case, $\alpha^*_i = 0$ implies $\beta^*_i = \gamma^*_i = 0$ as well.

In addition, the expansion of Equation (13) is further characterized by the following proposition:

Truly Virtual Support Vectors

For all training objects represented by $X_i$ lying on the margin (i.e., satisfying $G_i(w^*,X_i,y_i) \geq 0$ and $M^*_i \geq 0$), there exists $\theta_i \in \mathbb{R} \cup \{\infty\}$ such that the optimal weight vector $w^*$ can be written as $$w^* = \sum_{i=1}^{m} \alpha^*_i y_i \tilde{x}_i(\theta_i) = \sum_{i=1}^{m} y_i \alpha^*_i ((X_i)_{0,*} + \theta^*_i (X_i)_{1,*} + \theta^{*2}_i (X_i)_{2,*}) \quad (16)$$

Based on Equation (16), it is thus possible to identify both (1) the training objects represented by $X_i$ that are used in the expansion of the optimal weight vector $w^*$ and (2) the corresponding values $\theta^*_i$ of the transformation parameter $\theta$. Therefore, an exemplary semidefinite programming machine may be used to find virtual support vectors that were not explicitly provided in the original training object set. The result induces a classifier:

$$y(x) = \text{sign}((w^*)^T x) \quad (17)$$

Figure 5:
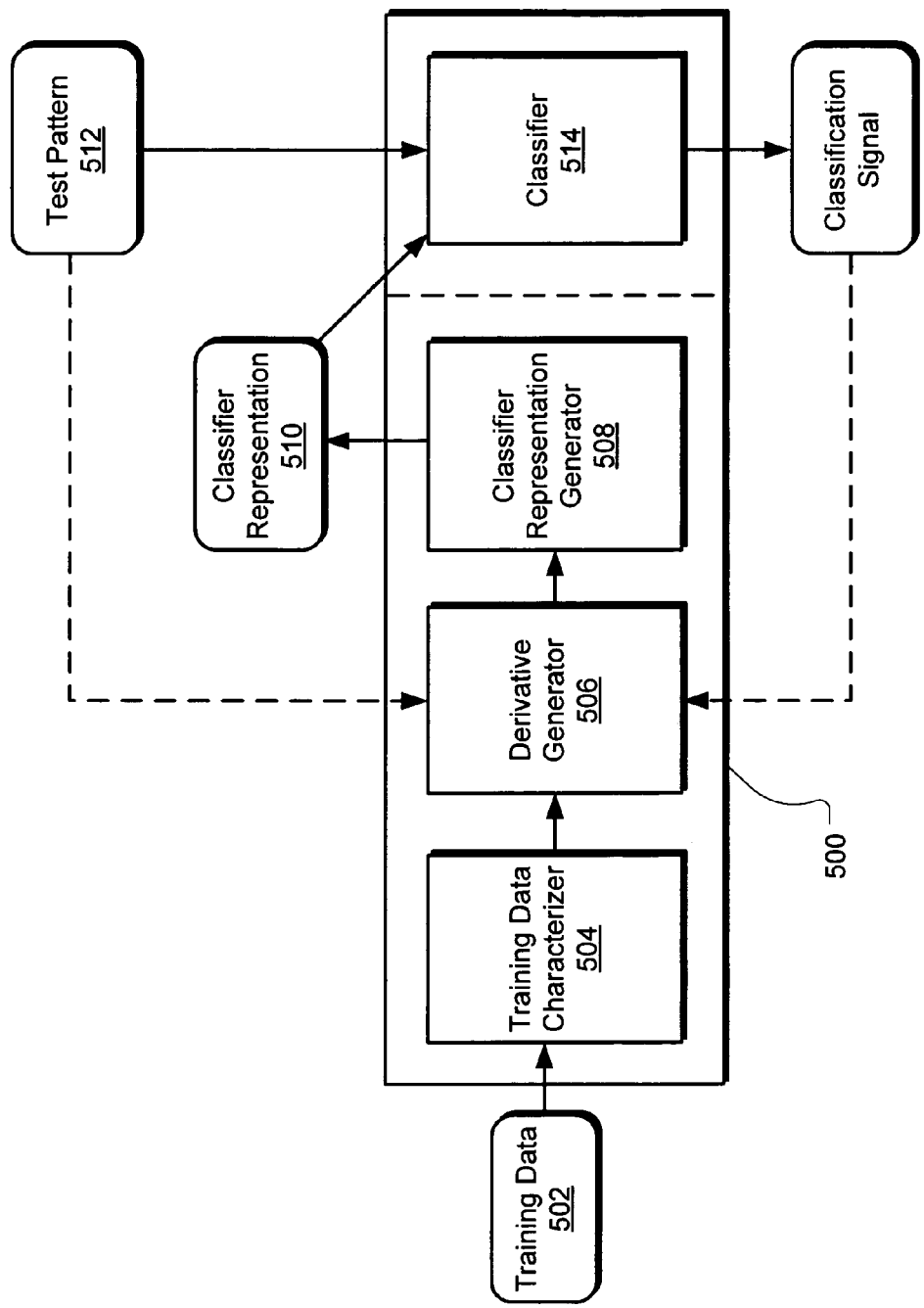
FIG. 5 illustrates an exemplary pattern recognition system useful for invariant pattern recognition.

FIG. 5 illustrates an exemplary pattern recognition system 500 useful for invariant pattern recognition. Training data 502 is input to a training data characterizer 504, which characterizes individual training patterns on the basis of feature values in a given number of dimensions r (e.g., in FIG. 1, three dimensions are shown; in FIG. 2, two dimensions are shown). Data points in n-dimensional feature space are defined by the feature values of each training pattern. Each training pattern is also associated with its classification (e.g., $y_i$).

A derivative generator 506 computes derivatives of a non-linear invariance transformation at each data point characterized by the training data characterizer 504. As described above, a polynomial of the form identified in Equation (2) may be used to approximate the invariant transformation. The coefficients of the transformation and its derivatives at each data point are input to a classifier representation generator 508, which outputs a classifier representation 510. In one implementation, the classifier representation 510 is in the form of an optimized weight vector $w^*$, as shown in Equation (16).

In some implementations, a test pattern 512 (e.g., a new handwritten character to be classified) may be input to a classifier 514, which, based on the input classifier representation 510, classifies the test pattern 512, such as by applying an equation of the form shown in Equation (17), to yield a classification signal 514. In one implementation, the classification signal 514 indicates to which class (e.g., of two classes) the pattern belongs.

It should be understood, however, that some implementations of the system 500 may be developed without the classifier 514. In these implementations, an optimized classifier representation may be generated and stored or distributed for future use with the classifier 514 or some other classifier.

As shown, in some implementations, the test pattern 512 and the classification signal 514 may be fed back to the derivative generator 506 to tune the classifier representation 510 based on the newly classified test pattern 512.

Figure 6:
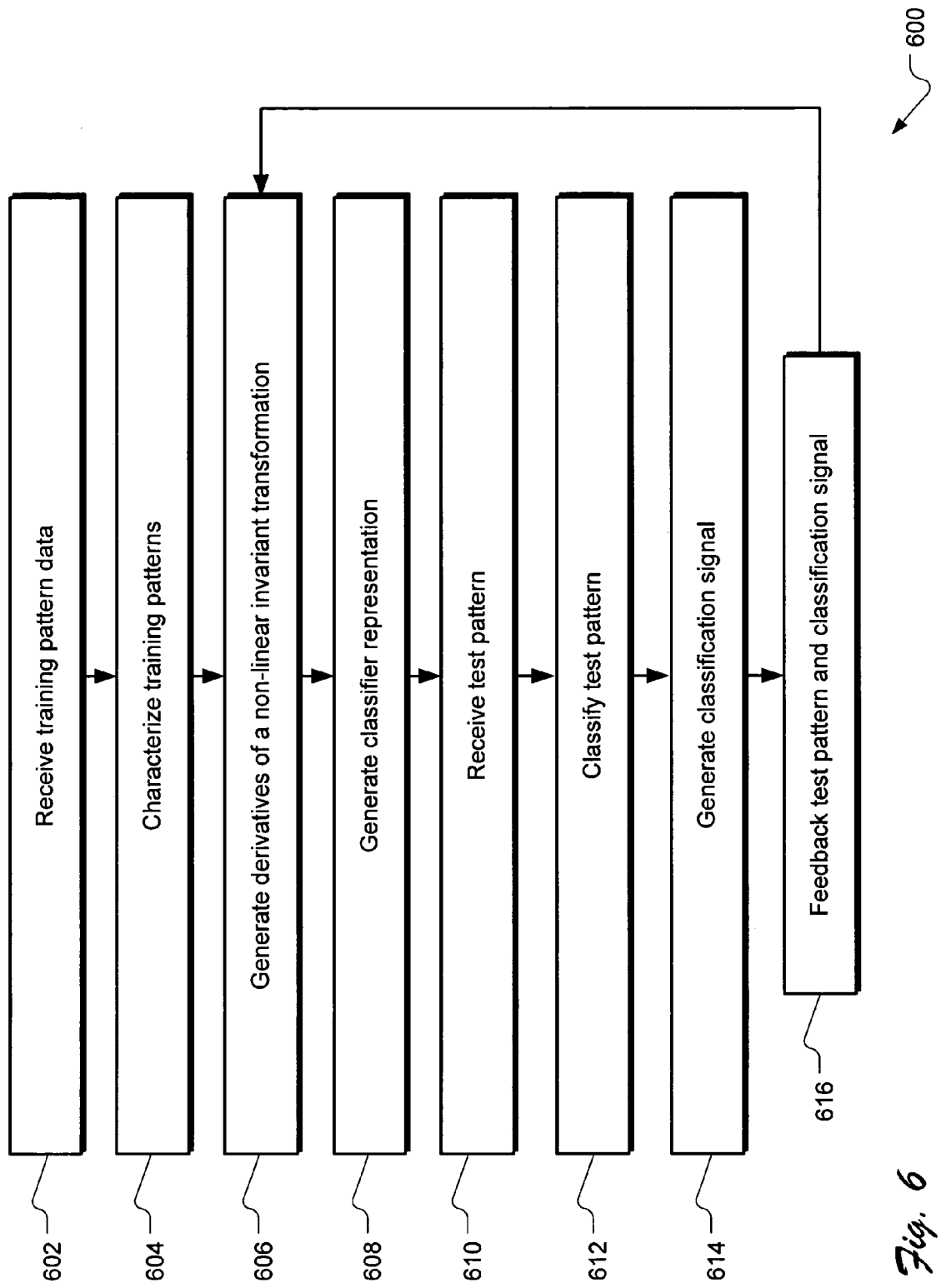
FIG. 6 illustrates exemplary operations for performing invariant pattern recognition.

FIG. 6 illustrates exemplary operations 600 for performing invariant pattern recognition. A receiving operation 602 receives training pattern data. A characterization operation 604 characterizes the training patterns in a given number of dimensions n by producing n feature values for each pattern. Each training pattern is also associated with its classification (e.g., $y_i$). A derivative operation 606 generates derivatives of a non-linear invariant transformation at each data point defined by the feature values of each pattern. Using the set of coefficients of the non-linear transformation and its derivatives at each data point, a classifier representation is generated at generation operation 608. In one implementation, the classifier representation is in the form of an optimized weight vector w*, as shown in Equation (16).

Another receiving operation 610 receives a test pattern, and a classifying operation 612 classifies the test pattern based on the classifier representation. For example, the classifying operation 612 may apply an equation of the form shown in Equation (17), to yield a classification signal in a generation operation 614. In one implementation, the classification signal indicates to which class (e.g., of two classes) the pattern belongs.

It should be understood that a classifier representation may be generated without proceeding to the classification operation. In these implementations, an optimized classifier representation may be generated and stored or distributed for future use with a classifier.

In one implementation, a feedback operation 616 may input the test pattern and the associated classification signal to the derivative operation 606 in order to refine the classifier representation.

In other implementations, it may not be desirable to enforce correct classification on the entire trajectory given by the polynomial example $\tilde{x}(\theta)$. In particular, when the polynomial is used as a local approximation to a global invariance, the polynomial may be restricted to a segment of the trajectory. Therefore, based on the following corollary to the Nesterov Proposition given herein, the examples $\tilde{x}(\theta)$ may be restricted to a closed interval $\theta \in [-\tau,\tau]$ on the real line by effectively doubling the degree of the polynomial used:

SD-Representability on a Segment

The set $\mathbb{R}_t^+(-\tau,\tau)$ of polynomials non-negative on a segment $[-\tau,\tau]$ is SD-representable.

Note that the matrix $G(w,X_i,y_i)$ is sparse because the resulting polynomial contains even powers of $\theta$.

In another implementation, more than one transformation may be considered concurrently. For example, in handwritten digit recognition, transformations such as rotation, scaling, translation, shear, thinning/thickening, etc. may all be relevant. The first statement of the Nesterov Proposition may be generalized to polynomials of more than one variable: for every psd matrix $P \geq 0$, the polynomial $p(\theta)=v_\theta^T P v_\theta$ is non-negative everywhere, even if $v_i$ is any power of $\theta_j$. Therefore, optimization is only over a subset of these polynomials.

For example, polynomials of degree two and $\theta:=\{1,\theta_1,\ldots,\theta_D\}$.

$$\tilde{x}(\theta) \approx \theta^T \begin{bmatrix} x_i(0) & \nabla_\theta^T x_i(0) \\ \nabla_\theta x_i(0) & \nabla_\theta \nabla_\theta^T x_i(0) \end{bmatrix} \theta \quad (18)$$

where $\nabla_\theta^T$ represents the gradient and $\nabla_\theta \nabla_\theta^T$ represents the Hessian operator. Note that the scaling behavior is with regard to the number D of parameters.

Support vector machines derive much of their popularity from the flexibility added by the use of kernels. Taking the dual SDPM as a starting point and assuming the Taylor expansion in Equation (2), differentiating through the kernel function allows representation of the polynomial trajectory in the feature space.

Therefore, it may be assumed that a feature map $\phi:\mathbb{R}^n \rightarrow \mathcal{F} \subseteq \mathbb{R}^N$ is fully characterized by $k:\chi \times \chi \rightarrow \mathbb{R}$, the kernel function corresponding to $\phi$ in the sense that $\forall x, \tilde{x} \in \chi : [\phi(x)]^T[\phi(\tilde{x})]=k(x,\tilde{x})$. The polynomial expansion (e.g., the Taylor expansion) is carried out in $\mathcal{F}$. An inner product expression between data points $x_i$ and $x_j$ differentiated, respectfully, u and v times reads $$\underbrace{[\phi^{(u)}(x_i)]^T[\phi^{(v)}(x_j)]}_{k^{(u,v)}(x_i,x_j)} = \sum_{s=1}^N \left(\frac{d^u \phi_s(x(\theta))}{d\theta^u}\bigg|_{\tilde{x}=x_i,\theta=0}\right) \cdot \left(\frac{d^v \phi_s(\tilde{x}(\tilde{\theta}))}{d\tilde{\theta}^u}\bigg|_{\tilde{x}=x_j,\tilde{\theta}=0}\right)$$

Figure 7:
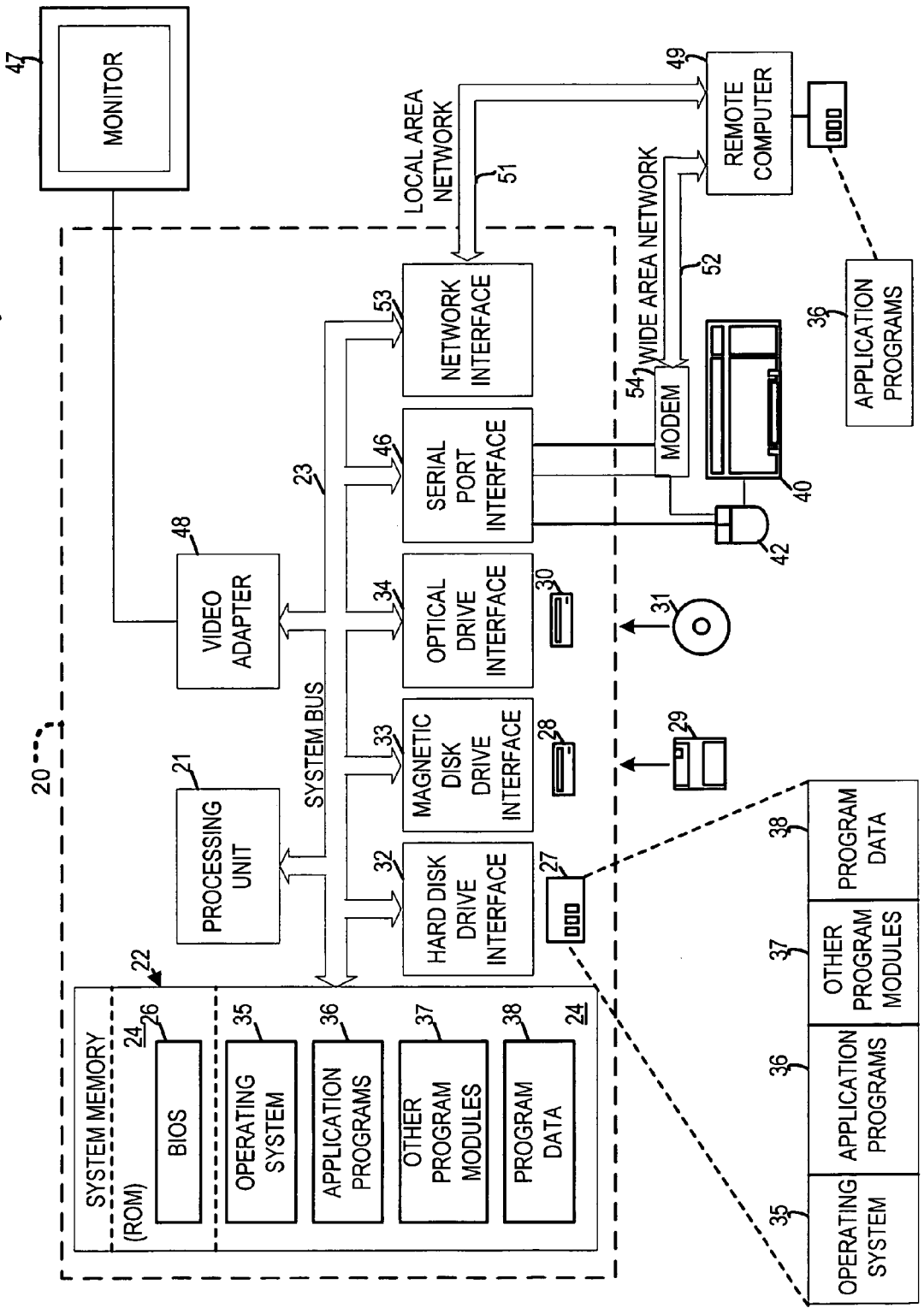
FIG. 7 illustrates a system useful for implementing an embodiment of the present invention.

The exemplary hardware and operating environment of FIG. 7 for implementing the invention includes a general purpose computing device in the form of a computer 20, including a processing unit 21, a system memory 22, and a system bus 23 that operatively couples various system components, including the system memory and the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 7. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the computer 20, or portions thereof, may be stored in the remote memory storage device. It is appreciated that the network connections shown are exemplary and other means of and communications devices for establishing a communications link between the computers may be used.

In an exemplary implementation, a training data characterizer, a derivative generator, a classifier representation generator, a classifier, and other modules may be incorporated as part of the operating system 35, application programs 36, or other program modules 37. Training data, a classifier representation, a test pattern, a classification signal, and other data may be stored as program data 38.

Some exemplary test patterns have been identified as image patterns and audio patterns. Other test patterns, including time series, may also be classified. Generally, a time series includes data ordered by the time the data were collected (usually spaced at equal intervals). Common examples of a time series include daily temperature measurements, monthly sales, and yearly population figures. Typical goals of time series analysis are to describe the process generating the data and to forecast future values.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
   generating derivatives of a nonlinear invariance transformation at a training data point with respect to a transformation parameter, the training data point representing one of a plurality of training patterns; and
   generating a classifier representation based on the derivatives for classifying a test pattern in the presence of the nonlinear invariance transformation;
   wherein the nonlinear invariance transformation models a change in lighting angle in an individual training pattern.

2. The method of claim 1 further comprising:
   classifying the test pattern based on the classifier representation.

3. The method of claim 1 further comprising:
   receiving the plurality of training patterns; and
   characterizing one of the training patterns to provide the training data point.

4. The method of claim 1 further comprising:
   classifying the test pattern based on the classifier representation to provide a classification signal; and
   inputting the test pattern to the operation of generating derivatives as a training pattern, responsive to the classifying operation.

5. The method of claim 1 further comprising:
   classifying the test pattern based on the classifier representation to provide a classification signal;
   inputting the test pattern to the operation of generating derivatives as a training pattern; and
   inputting the classification signal to the operation of generating derivatives in association with the test pattern.

6. The method of claim 1 wherein the non-linear invariant transformation is represented by a Taylor expansion polynomial.

7. The method of claim 1 embodied as computer-readable instruction on computer-readable media.

8. The method of claim 1 wherein the test pattern includes an image.

9. The method of claim 1 wherein the test pattern includes an audio input.

10. The method of claim 1 wherein the test pattern includes a handwriting pattern.

11. The method of claim 1 wherein the test pattern includes a time series.

12. The method of claim 1 further comprising:
restricting a range of the transformation parameter to a closed interval on a line of real numbers.

13. The method of claim 1 further comprising:
representing a scalar product of the classifier representation with the derivatives of the nonlinear invariance transformation at the training data point with respect to the transformation parameter by a nonlinear positive definite real-valued kernel function.

14. The method of claim 1 wherein the operation of generating derivatives comprises:
generating derivatives of the nonlinear invariance transformation at the training data point with respect to a plurality of transformation parameters.

15. A method comprising:
generating derivatives of a nonlinear invariance transformation at a training data point with respect to a transformation parameter, the training data point representing one of a plurality of training patterns; and
generating a classifier representation based on the derivatives for classifying a test pattern in the presence of the nonlinear invariance transformation;
wherein the nonlinear invariance transformation models a change in brightness in an individual training pattern.

16. The method of claim 15 wherein the computer process further comprises:
classifying the test pattern based on the classifier representation.

17. The method of claim 15 wherein the computer process further comprises:
receiving the plurality of training patterns; and
characterizing one of the training patterns to provide the training data point.

18. The method of claim 15 wherein the computer process further comprises:
classifying the test pattern based on the classifier representation; and inputting the test pattern to the operation of generating derivatives as a training pattern, responsive to the classifying operation.

19. The method of claim 15 wherein the computer process further comprises:
classifying the test pattern based on the classifier representation to provide a classification signal;
inputting the test pattern to the operation of generating derivatives as a training pattern; and
inputting the classification signal to the operation of generating derivatives in association with the test pattern.

20. The method computer program product of claim 15 wherein the non-linear invariant transformation is represented by a Taylor expansion polynomial.

21. The method of claim 15 embodied as computer-executable instructions on computer-readable media.

22. The method of claim 15 wherein the test pattern includes an image.

23. The method of claim 15 wherein the test pattern includes an audio input.

24. The method of claim 15 wherein the test pattern includes a handwriting pattern.

25. The method of claim 15 wherein the test pattern includes a time series.

26. The method of claim 15 wherein the computer process further comprises:
restricting a range of the transformation parameter to a closed interval on a line of real numbers.

27. The method of claim 15 wherein the computer process further comprises:
representing a scalar product of the classifier representation with the derivatives of the nonlinear invariance transformation at the training data point with respect to the transformation parameter by a nonlinear positive definite real-valued kernel function.

28. The method of claim 15 wherein the operation of generating derivatives comprises:
generating derivatives of the nonlinear invariance transformation at the training data point with respect to a plurality of transformation parameters.

29. A system comprising:
a derivative generator generating derivatives of a nonlinear invariance transformation at a training data point with respect to a transformation parameter, the training data point representing one of a plurality of training patterns; and
a classifier representation generator generating a classifier representation based on the derivatives for classifying a test pattern in the presence of the nonlinear invariance transformation;
wherein the nonlinear invariance transformation models a change in lighting angle in an individual training pattern.

30. The system of claim 29 further comprising:
a classifier classifying the test pattern based on the classifier representation;
a training data characterizer receiving the plurality of training patterns and
characterizing one of the training patterns to provide the training data point.

31. The system of claim 29 wherein the derivative generator inputs the test pattern as a training pattern.

32. The system of claim 29 further comprising:
a classifier classifying the test pattern based on the classifier representation to provide a classification signal, wherein the derivative generator inputs the test pattern as a training pattern and inputs the classification signal in association with the test pattern.

33. The system of claim 29 wherein the non-linear invariant transformation is represented by a Taylor expansion polynomial.

34. The system of claim 29 wherein the test pattern includes an image.

35. The system of claim 29 wherein the test pattern includes an audio input.

36. The system of claim 29 wherein the test pattern includes a handwriting pattern.

37. The system of claim 29 wherein the test pattern includes a time series.

38. The system of claim 29 wherein a range of the transformation parameter is restricted to a closed interval on a line of real numbers.

39. The system of claim 29 wherein a nonlinear positive definite real-valued kernel function represents a scalar product of the classifier representation with the derivatives of the nonlinear invariance transformation at the training data point with respect to the transformation parameter.

40. The system of claim 29 wherein the classifier representation generator generates derivatives of the nonlinear invariance transformation at the training data point with respect to a plurality of transformation parameters.

41. A method comprising:
characterizing a plurality of training patterns, each training pattern corresponding to a training data point in a feature space;
determining a classification for each training pattern;
generating derivatives of a nonlinear invariance transformation at individual training data points with respect to a transformation parameter; and
generating an optimized weight vector, based on the derivatives and the classification of each training pattern, for classifying a test pattern in the presence of the nonlinear invariance transformation;
wherein the nonlinear invariance transformation models a change in lighting angle in an individual training pattern.

42. The method of claim 41 further comprising:
classifying the test pattern based on the optimized weight vector.

43. The method of claim 41 further comprising:
classifying the test pattern based on the optimized weight vector to provide a classification signal; and
inputting the test pattern to the operation of generating derivatives as a training pattern, responsive to the classifying operation.

44. The method of claim 41 further comprising:
classifying the test pattern based on the optimized weight vector to provide a classification signal;
inputting the test pattern to the operation of generating derivatives as a training pattern; and
inputting the classification signal to the operation of generating derivatives in association with the test pattern.

45. The method of claim 41 wherein the non-linear invariant transformation is represented by a Taylor expansion polynomial.

46. A method comprising:
characterizing a plurality of training patterns, each training pattern corresponding to a training data point in a feature space;
determining a classification for each training pattern;
generating derivatives of a nonlinear invariance transformation at individual training data points with respect to a transformation parameter; and
generating an optimized weight vector, based on the derivatives and the classification of each training pattern, for classifying a test pattern in the presence of the nonlinear invariance transformation;
wherein the nonlinear invariance transformation models a change in brightness in an individual training pattern.

47. The method of claim 46 wherein the computer process further comprises:
classifying the test pattern based on the optimized weight vector.

48. The method of claim 46 wherein the computer process further comprises:
characterizing one of the training patterns to provide the training data point.

49. The method of claim 46 wherein the computer process further comprises:
classifying the test pattern based on the optimized weight vector; and
inputting the test pattern to the operation of generating derivatives as a training pattern, responsive to the classifying operation.

50. The method of claim 46 wherein the computer process further comprises:
classifying the test pattern based on the optimized weight vector to provide a classification signal;
inputting the test pattern to the operation of generating derivatives as a training pattern; and
inputting the classification signal to the operation of generating derivatives in association with the test pattern.

51. The method of claim 46 wherein the non-linear invariant transformation is represented by a Taylor expansion polynomial.

52. A system comprising:
a training data characterizer characterizing a plurality of training patterns, each training pattern corresponding to a training data point in a feature space and determining a classification for each training pattern;
a derivative generator generating derivatives of a nonlinear invariance transformation at individual training data points with respect to a transformation parameter; and
a classifier representation generator generating an optimized weight vector, based on the derivatives and the classification of each training pattern, for classifying a test pattern in the presence of the nonlinear invariance transformation;
wherein the nonlinear invariance transformation models a change in lighting angle in an individual training pattern.

53. The system of claim 52 further comprising:
a classifier classifying the test pattern based on the classifier representation.

54. The system of claim 52 further comprising:
a training data characterizer receiving the plurality of training patterns and characterizing one of the training patterns to provide the training data point.

55. The system of claim 52 wherein the derivative generator inputs the test pattern as a training pattern.

56. The system of claim 52 further comprising:
a classifier classifying the test pattern based on the classifier representation to provide a classification signal, wherein the derivative generator inputs the test pattern as a training pattern and inputs the classification signal in association with the test pattern.

57. The system of claim 52 wherein the non-linear invariant transformation is represented by a Taylor expansion polynomial.

58. A system comprising:
a derivative generator generating derivatives of a nonlinear invariance transformation at a training data point with respect to a transformation parameter, the training data point representing one of a plurality of training patterns; and
a classifier representation generator generating a classifier representation based on the derivatives for classifying a test pattern in the presence of the nonlinear invariance transformation;
wherein the nonlinear invariance transformation models a change in brightness in an individual training pattern.

59. The system of claim 58 further comprising:
a classifier classifying the test pattern based on the classifier representation;
a training data characterizer receiving the plurality of training patterns and
characterizing one of the training patterns to provide the training data point.

60. The system of claim 58 wherein the derivative generator inputs the test pattern as a training pattern.

61. The system of claim 58 further comprising:
a classifier classifying the test pattern based on the classifier representation to provide a classification signal, wherein the derivative generator inputs the test pattern as a training pattern and inputs the classification signal in association with the test pattern.

62. The system of claim 58 wherein the non-linear invariant transformation is represented by a Taylor expansion polynomial.

63. The system of claim 58 wherein the test pattern includes an image.

64. The system of claim 58 wherein the test pattern includes an audio input.

65. The system of claim 58 wherein the test pattern includes a handwriting pattern.

66. The system of claim 58 wherein the test pattern includes a time series.

67. The system of claim 58 wherein a range of the transformation parameter is restricted to a closed interval on a line of real numbers.

68. The system of claim 58 wherein a nonlinear positive definite real-valued kernel function represents a scalar product of the classifier representation with the derivatives of the nonlinear invariance transformation at the training data point with respect to the transformation parameter.

69. The system of claim 58 wherein the classifier representation generator generates derivatives of the nonlinear invariance transformation at the training data point with respect to a plurality of transformation parameters.

70. The method of claim 41 embodied as computer-executable instructions on computer-readable media.

71. The method of claim 46 embodied as computer-executable instructions on computer-readable media.

72. A system comprising:
a training data characterizer characterizing a plurality of training patterns, each training pattern corresponding to a training data point in a feature space and determining a classification for each training pattern;
a derivative generator generating derivatives of a nonlinear invariance transformation at individual training data points with respect to a transformation parameter; and
a classifier representation generator generating an optimized weight vector, based on the derivatives and the classification of each training pattern, for classifying a test pattern in the presence of the nonlinear invariance transformation;
wherein the nonlinear invariance transformation models a change in brightness in an individual training pattern.

73. The system of claim 72 further comprising:
a classifier classifying the test pattern based on the classifier representation.

74. The system of claim 72 further comprising:
a training data characterizer receiving the plurality of training patterns and characterizing one of the training patterns to provide the training data point.

75. The system of claim 72 wherein the derivative generator inputs the test pattern as a training pattern.

76. The system of claim 72 further comprising:
a classifier classifying the test pattern based on the classifier representation to provide a classification signal, wherein the derivative generator inputs the test pattern as a training pattern and inputs the classification signal in association with the test pattern.

77. The system of claim 72 wherein the nonlinear invariant transformation is represented by a Taylor expansion polynomial.

* * * * *